United States Patent Office 3,336,124
Patented Aug. 15, 1967

3,336,124
STABILIZED DISTILLATE FUEL OILS AND
ADDITIVE COMPOSITIONS THEREFOR
William P. Dunworth, Wilmington, Del., assignor to E. I.
du Pont de Nemours and Company, Wilmington, Del.,
a corporation of Delaware
No Drawing. Filed Aug. 25, 1964, Ser. No. 392,044
The portion of the term of the patent subsequent to
June 1, 1982, has been disclaimed
14 Claims. (Cl. 44—62)

This application is a continuation-in-part of my copending application Ser. No. 178,536, filed Mar. 9, 1962, now U.S. Patent 3,186,810.

This invention relates to stabilized petroleum distillate fuel oils and to additive compositions for stabilizing such fuel oils. More particularly, the invention is concerned with fuel oils, such as diesel engine fuels and burner oils, that are normally susceptible to deterioration with the formation of insoluble sludge and sediment, especially at elevated temperatures, which fuel oils have been stabilized to inhibit such deterioration; and to homogeneous liquid concentrates of a combination of additive compounds for so stabilizing such fuel oils, which concentrates are readily soluble in the fuel oils and which are unusually effective to so stabilize such fuel oils.

Catlin and Robbins, in U.S. Patent 2,737,452, Seigel in U.S. Patent 3,008,813 and Bauer et al. in Canadian Patent 592,974, describe stabilized fuel oil compositions obtained by incorporating into the oils certain oil-soluble ashless, addition type copolymers. Such additives function primarily to suspend sludge and sediment that may already be present or that may form in their presence. While also somewhat effective as stabilizers, they are not entirely satisfactory for inhibiting the formation of colored bodies and insoluble matter, particularly at elevated temperatures. Diesel fuels, having improved high temperature stability, are expressly desired, for example, for use in locomotives wherein rather stringent pre-combustion conditions generally prevail, and special methods have been devised to test the suitability of fuels for this use. In jet fuels also, which serve as heat exchange media for the engine before being combusted, high thermal stability is of prime importance.

Quite naturally, co-additives have been sought to augment the already satisfactory dispersancy obtainable with the polymeric additives and thereby to render fuel compositions less susceptible to the formation of normally occurring sludges and sediments that tend to clog fuel feed lines, spray nozzles and filter screens. Substances proposed heretofore for use in conjunction with the polymeric dispersants, including certain long straight-chain and branched-chain surface active amines, though providing some protection at ordinary atmospheric temperatures, are not entirely satisfactory stabilizers at elevated temperatures.

Another problem, often encountered with fuel oils in the field, is the development of objectionable haze under conditions of storage and transfer, apparently the result of water accumulating in the fuel, as described by Eberz in U.S. Patent 2,550,982.

It is an object of this invention to improve the stability of hydrocarbon distillate fuel oils against deterioration such as the formation of discoloration, insoluble sludge, and sediment. A further object is to augment the stabilizing properties of certain polymeric dispersants of fuel oil sludge and sediment by employing in combination therewith an inhibitor of fuel oil deterioration processes which is particularly effective at elevated temperatures as well as at ordinary temperatures and in which the combination of additives function synergistically and are more effective than other similar combinations of the prior art. Another object is to provide additive compositions for distillate hydrocarbon fuel oils, which compositions are homogeneous concentrates of a plurality of co-additives, and which concentrates are easily incorporated into said fuel oils and are unusually effective to inhibit discoloration and the formation and deposition of insoluble sludge and sediment in such fuel oils, particularly at high temperatures. Other objects are to provide new compositions of matter and to advance the art. Still other objects will appear hereinafter.

The above and other objects may be accomplished in accordance with this invention which comprises a distillate hydrocarbon fuel oil containing (a) From 0.00017% to about 0.01% by weight of an oil-soluble polymeric dispersant taken from the group consisting of ($a_1$) A basic amino nitrogen-containing addition copolymer containing in combined form as its essential monomeric components copolymerizable ethylenically unsaturated compounds, each containing only one polymerizable ethylenic linkage, at least one of which components is amine-free and contains from 8 to about 18 carbon atoms in an aliphatic hydrocarbon chain which in the polymer is not part of the main chain, and one of the components as it exists in the polymer containing a basic amino nitrogen in the side chain, said copolymer containing 0.1% to 3.5% by weight of basic amino nitrogen and said copolymer having an inherent viscosity of 0.1 to 3.0 as determined at 0.1% weight/volume concentration in benzene at 25° C., ($a_2$) A copolymer comprising in copolymerized form from 10% to 30% by weight of a $C_8$–$C_{18}$ alkyl chloropropyleneoxy mixed ester of a $C_4$–$C_5$ unsaturated conjugated dibasic acid and from 90% to 70% by weight of a copolymerizable monomer taken from the group consisting of vinyl esters of $C_1$–$C_4$ fatty carboxylic acids, $C_8$–$C_{20}$ alkyl maleates, $C_8$–$C_{20}$ alkyl fumarates, and mixtures thereof, said polymer having a molecular weight between 6,000 and 20,000 Staudinger, and ($a_3$) A copolymer comprising in copolymerized form from 5% to 30% by weight of an N-vinyl pyrrolidinone taken from the group consisting of N-vinyl pyrrolidinone and ring-alkylated N-vinyl pyrrolidinones having from 7 to 10 carbon atoms in the molecule, 65% to 95% by weight of at least one acrylic ester of the formula $CH_2=CH(R)COOR_1$ wherein R is a member of the group consisting of hydrogen and methyl radicals and $R_1$ stands for at least one alkyl group of from 4 to 18 carbons and having an average of at least 8 carbon atoms, and 0% to 5% by weight of an aminoalkyl acrylate of the formula $CH_2=C(R)COOC_nH_{2n}NR_2R_3$ wherein R is a member of the group consisting of hydrogen and methyl radicals, $C_nH_{2n}$ stands for an alkylene radical wherein $n$ is an integer of from 2 to 3, and $R_2$ and $R_3$ are members of a group of $C_1$–$C_4$ alkyl radicals when taken individually and members of a group of ethylene, trimethylene, tetramethylene and diethyleneoxy radicals when taken together, and (b) From 0.00017% to 0.01% by weight of an N-substituted cyclohexylamine in which the substituents consist of 1 to 2 alkyl groups of 1 to 4 carbon atoms; and an additive composition for distillate hydrocarbon fuel oils, which additive composition consists essentially of (a) An oil-soluble polymeric dispersant as defined above under ($a_1$), ($a_2$) and ($a_3$), (b) From 0.2 to about 3 parts by weight per part of said copolymer (a) of an N-substituted cyclohexylamine in which the substituents consist of 1 to 2 alkyl groups of 1 to 4 carbon atoms, and (c) A normally liquid inert hydrocarbon carrier solvent in an amount to constitute from about 20% to about 80% by weight of the composition.

A particularly preferred additive composition for distillate hydrocarbon fuel oils consists essentially of (a) An oil-soluble, basic amino nitrogen-containing addition copolymer which is a 50/40/10 tripolymer of octadecenyl methacrylate, sytrene and betadiethylaminoethyl methacrylate contained in combined form as the essential monomeric copolymerizable ethylenically unsaturated compounds, said tripolymer containing 0.1% to 3.5% by weight of basic amino nitrogen and having an inherent viscosity of 0.1 to 3.0 as determined at 0.1% weight/volume concentration in benzene at 25° C., (b) From 0.2 to about 3 parts by weight per part of of said tripolymer (a) of N,N-dimethylcyclohexylamine, and (c) A normally liquid inert hydrocarbon carrier solvent in an amount to constitute from about 20% to about 80% by weight of the composition.

It has been found that the combination of such polymeric dispersant and N-loweralkyl substituted cyclohexylamine is unusually effective to stabilize fuel oils against deterioration, particularly at elevated temperatures. The polymeric additive apparently functions to disperse sludge and sediment, while the nonpolymeric N-substituted cyclohexylamine serves effectively to retard the formation of such insoluble matter. Surprisingly, the combination of additives is more effective to stabilize the fuel than either additive alone on an equal weight basis, that is, the additives function synergistically in the combination to produce results greater than the sum of the individual components. Moreover, the N-substituted cyclohexylamines, in particular N,N-dimethyl cyclohexylamine, in combination with the polymeric dispersants of this invention, are more effective high temperature inhibitors of sludge formation than other amines heretofore suggested for inhibiting sludge formation in such fuel oils, such as the tertiary primary amines disclosed by Andress in U.S. Patent 2,945,749. Furthermore, it has been found that the oil-soluble polymeric additive and the N-loweralkyl substituted cyclohexylamine may both be dissolved in high concentrations in conventional normally liquid hydrocarbon carrier solvents to form homogeneous concentrates which can be readily added to and dissolved in the distillate hydrocarbon fuel oils.

Surprisingly, long-chain quaternary ammonium halides and nitrites, which are effective and desirable to retard the formation of haze and to eliminate fogging in distillate hydrocarbon fuel oils, may be included in such concentrates without destroying their homogeneity. Concentrates and fuel oils, containing such quaternary ammonium halides and nitrites and metal deactivators in combination with such polymeric dispersants and N-loweralkyl cyclohexylamine constitute additional important novel compositions of this invention. Such concentrates constitute-homogeneous multifunctional additive compositions of this invention which are highly effective to stabilize distillate hydrocarbon fuel oils, to disperse sludge and sediment in such fuel oils, to combat hazing and emulsification tendencies of such fuel oils, and to retard rusting of ferrous metal containers during storage of such fuel oils therein.

The N-substituted cyclohexylamine component may be an N-monoloweralkyl- or an N,N-diloweralkylcyclohexylamine in which "loweralkyl" means an alkyl radical of 1–4 carbon atoms, such as N-methylclohexylamine, N,N-dimethylcyclohexylamine, N-ethylcyclohexylamine, N,N-diethylcyclohexylamine, N-propylcyclohexylamine, N,N-dipropylcyclohexylamine, N-butylcyclohexylamine, N,N-dibutylcyclohexylamine, and mixtures of any 2 or more thereof. The tertiary amines are preferred, particularly N,N-dimethylcyclohexylamine. These mono- and di-loweralkylcyclohexylamines are well known and are conveniently obtained from the correspondingly N-alkylated anilines, by ring-reduction as known to the art. For example, N,N-dimethylcyclohexylamine is conveniently obtained by methylating aniline with methanol in the presence of an acid catalyst, as described in the art (Kirk-Othmer, Encyclopedia of Chemical Technology, Interscience, vol. 1, pages 915, 916, 923, 924), and catalytically hydrogenating the N-methylated aniline product to the corresponding cyclohexylamine derivative. The technical product, which may often contain small proportions, e.g. 1–5% weight, of the N-monomethylcyclohexylamine, is also suitable for use according to this invention. Such product, as well as the pure dimethyl compound, will be referred to hereinafter as N,N-dimethylcyclohexylamine (DMCHA).

N,N-dimethylcyclohexylamine is normally liquid and readily soluble in the fuel oils. It is substantially not extractable from the fuel oils by water, does not contribute to water hazing or emulsification, and is ashless. Also, it is compatible with other additives normally associated with the finished fuels, such as sludge dispersants, corrosion inhibitors and anti-hazing agents, and may be used to advantage with one or more of such other additives, as more particularly described in my copending application Ser. No. 291,360, filed June 28, 1963, now abandoned.

The polymeric sludge dispersant may be any of those described by Catlin et al. in U.S. Patent 2,737,452, Biswell in U.S. Patent 2,805,925, and Winnick in U.S. Patent 2,888,340. Such polymeric substance may be defined as an oil-soluble, basic amino nitrogen-containing addition type copolymer containing in combined form as its essential monomeric components copolymerizable ethylenically unsaturated compounds, each containing only one polymerizable ethylenic linkage, at least one of which components is amine-free and contains from 8 to about 18 carbon atoms in an aliphatic hydrocarbon chain which in the polymer is not part of the main chain, and one of the components as it exists in the polymer containing a basic amino nitrogen in the side chain, said copolymer containing 0.1% to 3.5% by weight of basic amino nitrogen and said copolymer having an inherent viscosity of 0.1 to 3.0 as determined at 0.1% weight/volume concentration in benzene at 25° C. As a class, these copolymers are characterized as having basic amino groups appended to the main polymer chain. Preferred polymers contain pendent tertiary amino groups such as diethylaminoethyl-, dimethylaminopropyl-, dibutylaminoethyl-, and 2-pyridylethyl groups, as illustrated in the following representative polymers:

the 50/40/10 tripolymer of octadecenyl methacrylate, styrene, and beta-diethylaminoethyl methacrylate; the 50/40/10 tripolymer of technical-lauryl methacrylate, styrene and N-(tert.-butylaminoethyl) methacrylate; the 50/37/13 tripolymer of octodecenyl methacrylate, styrene and dibutylaminoethyl methacrylate; the 50/40/10 tripolymer of lauryl methacrylate, styrene and morpholinoethyl methacrylate; the 50/40/10 tripolymer of lauryl methacrylate, styrene and dimethylaminoethyl methacrylate; the 80/20 copolymer of lauryl methacrylate and diethylaminoethyl methacrylate; the 90/10 copolymer of octadecenyl methacrylate and diethylaminoethyl methacrylate; the 77/23 copolymer of lauryl methacrylate and dibutylaminoethyl methacrylate; the 90/10 copolymer of cetyl methacrylate and 4-vinylpyridine; the 80/20 copolymer of lauryl methacrylate and 4-vinylpyridine; the 92.5/7.5 copolymer of lauryl methacrylate and diethylaminoethyl methacrylate; the 80/20 copolymer of vinyl lauryl ether and vinyl diethylaminoethyl ether; and the 92.5/7.5 copolymer of vinyl laurate and diethylaminoethyl methacrylate; the quantities expressing the above compositions being parts by weight.

The polymeric dispersant may also be of the class of oil-soluble polymers of molecular weight between 6000 and 20,000 Staudinger described by Siegel in U.S. Patent 3,008,813, particularly those prepared by copolymerizing monomer mixtures comprising 10% to 30% by weight of a $C_8$–$C_{18}$ alkyl chloropropyleneoxy mixed ester of a $C_4$–$C_5$ unsaturated conjugated dibasic acid, such as maleic, fumaric, mesaconic, citraconic acids, and mixtures of such acids or their anhydrides, and 90% to 70% by weight of a polymerizable vinyl monomer, particularly vinyl esters of short chain fatty acids, e.g. vinyl acetate and vinyl propionate, $C_8$–$C_{20}$ alkyl maleates and fumarates, e.g. lauryl maleate and tallow fumarate, and preferably mixtures of such vinyl esters, maleates and fumarates in proportions of 1 part vinyl ester for every 1–5 parts other ester by weight. Representative of this class of polymeric dispersant are: the 19/20/61 tripolymers of isoctyl chloropropyleneoxy maleate, vinyl acetate and mixed $C_{16}$–$C_{18}$ alkyl fumarates; the 15/15/70 tripolymer of technical lauryl (i.e. $C_8$–$C_{18}$ alkyl) chloropropyleneoxy maleate, vinyl propionate and a 1:1 by weight mixture of technical lauryl maleate and tallow fumarate; the 30/70 copolymer of isoctyl chloropropyleneoxy maleate and technical lauryl maleate; the 12/28/60 tripolymer of isoctyl chloropropyleneoxy fumarate, vinyl butyrate and technical lauryl maleate; the quantities expressing the above compositions being parts by weight.

The polymeric dispersant may also be of the character disclosed by Bauer et al. in Canadian Patent 592,974 which comprises in copolymerized form from 5% to 30% by weight of an N-vinyl pyrrolidinone or N-vinyl-alkyl-pyrrolidinone having from 7 to 10 carbon atoms in the molecule, 65% to 95% of one or more acrylic ester of the formula $CH_2=C(R)COOR_1$ wherein R is a hydrogen atom or a methyl radical and $R_1$ is a $C_4$–$C_{18}$ alkyl group, said acrylic ester component being so constituted as to provide an average of at least 8 carbon atoms $R_1$ in the copolymer, and 0% to 5% of an aminoalkyl acrylate of the formula $CH_2=C(R)COOC_nH_{2n}NR_2R_3$ wherein R is a hydrogen atom or a methyl radical, $C_nH_{2n}$ is an alkylene radical wherein $n=2$ to 3, and $R_2$ and $R_3$ are $C_1$–$C_4$ alkyl radicals when taken individually or stand for divalent ethylene, trimethylene, tetramethylene, and diethyleneoxy radicals when taken together (so as to form with the nitrogen atom a monoheterocyclic amine radical). Representative oil-soluble polymeric dispersants of this type are: the 65/25/10 tripolymer of n-($C_{12}$–$C_{18}$)alkyl methacrylate, butyl acrylate and N-vinyl pyrrolidinone; the 70/30 copolymer of n-($C_{12}$–$C_{14}$)alkyl methacrylate and N-vinyl pyrrolidinone; the 95/5 copolymer of dodecylmethacrylate and N-vinyl pyrrolidinone; the 65/25/10 tripolymer of n-($C_{16}$–$C_{18}$)alkyl methacrylate, dodecyl methacrylate, and 3-methyl-1-vinyl pyrrolidinone; the 80/20 copolymer of n-($C_{12}$–$C_{14}$)alkyl methacrylate and 3,3,5-trimethyl-1-vinyl-pyrrolidinone; the 90/8/2 tripolymer of n-($C_{12}$–$C_{14}$)alkyl methacrylate, 3,3,5-trimethyl-1-vinyl pyrrolidinone, and dimethylaminoethyl methacrylate; the 89/8/3 tripolymer of n-($C_{12}$–$C_{14}$)alkyl methacrylate, 3,3-dimethyl-1-vinyl pyrrolidinone and diethylaminoethyl methacrylate; the 90/9/1 tripolymer of n-($C_{12}$–$C_{14}$)alkyl methacrylate, 4,5-dimethyl-1-vinyl pyrrolidinone and morpholinoethyl methacrylate; the 90/10 copolymer of n-($C_{12}$–$C_{14}$)alkyl methacrylate and N-vinyl pyrrolidinone; the quantities expressing the above compositions being parts by weight.

Broadly, the distillate fuel oils are mixtures of hydrocarbons boiling in the range of from about 300° F. to about 900° F., which mixtures are normally susceptible to deterioration with the formation of colored bodies and insoluble sludge and sediment under thermal and oxidative conditions. The present invention is particularly concerned with stabilizing such products as diesel engine oils for stationary, marine, automotive and locomotive type engines, said fuels being particularly described by ASTM Specification D–975–53T; and domestic and industrial heating oils, as described in ASTM Specification D–396–48T. Included are straight-run fuels, thermally cracked, catalytically cracked, thermally reformed, catalytically reformed stocks, hydrogenated No. 2 fuel oils, and blends of 2 or more thereof, as known and commonly employed in the art.

The quantities of the co-additives employed in practicing this invention will vary depending on the particular additives, the initial condition and degree of instability of the fuel oil, and the effect desired. Normally, however, there is used at least about 0.5 lb. of basic amino nitrogen-containing copolymer for each 1000 bbls. of fuel (0.00017% by weight based on the fuel) and not more than about 30 lbs./1000 bbls. (0.01% by weight), preferably from about 1.5 to about 15 lbs./1000 bbls. (0.0005% to 0.005% by weight). The N-substituted cyclohexylamine is used in comparable quantities, generally in amounts corresponding to from about 0.2 to about 3 parts by weight per part of the copolymer, and preferably from about 0.5 to about 2 parts per part of copolymer.

The co-additives of this invention are oil-soluble and may be added directly as such to the fuel to be stabilized, or they may be added as mixtures, with or without solvents, which may include, if desired, other addition agents normally associated with the finished fuels. Blended concentrates, containing a total of from about 20% to about 80%, preferably from about 40% to about 60%, by weight of the co-additives in normally liquid inert hydrocarbon carrier solvents represent the commercial form of the fuel oil stabilizing compositions. In other words, the carrier solvent will be in an amount to constitute from about 20% to about 80%, preferably from about 40% to about 60%, by weight of the blended concentrates or additive compositions. Suitable carrier solvents are exemplified by such hydrocarbon solvents as kerosene, benzene, toluene, the xylenes, and the like, and mixtures of any two or more of such solvents. As illustrated in the art, for example by Catlin et al. in U.S. Patent 2,737,452, the polymeric dispersant is normally prepared in the presence of an inert hydrocarbon solvent, and it may be used in this invention as so prepared without separation from the solvent, whereby such solvent will constitute part or all of the carrier solvent in the blended concentrates. Other addition agents, that may be employed in conjunction therewith in the fuels, include metal deactivators, corrosion inhibitors, antistatic agents, antihazing agents, and the like.

In particularly desirable embodiments of this invention, co-additive concentrates are provided comprising essentially homogeneous blends of the preferred basic amino nitrogen-containing copolymer and N,N-dimethylcyclohexylamine together with a long-chain quaternary ammonium surfactant as haze retarder. As described by Eberz in U.S. Patent 2,550,982, surface active quaternary ammonium compounds are particularly effective to inhibit or eliminate fogging in hydrocarbon products. When it was attempted to formulate a multipurpose additive comprising the basic amino nitrogen-containing copolymeric dispersant as herein defined and a haze retarder, such as a quaternary ammonium surfactant (in the absence of the N,N-dimethylcyclohexylamine of this invention), an unexpected difficulty developed. The additives, while soluble individually in the usual hydrocarbon solvents, are mutually insoluble in combination at the concentrations ordinarily employed for formulating fuel oil additive concentrates. However, in the presence of the N,N-dimethylcyclohexylamine of this invention, both the copolymeric dispersant and the antihazing quaternary ammonium salt can be used together to readily form homogeneous concentrated blends with the usual hydrocarbon solvents. For this use, the quaternary ammonium compound usually amounts to from about 0.2 to about 0.5 part by weight per part of the copolymer, and from about 0.3 to about 3 lbs./1000 bbls. (0.0001% to 0.001% weight) of the fuel.

Typical antihazing quaternary ammonium surfactants are the oil-soluble quaternary ammonium halides and nitrites in which the groups attached to nitrogen, other than the halogen atom and the nitrite group, consist of 1 to 2 hydrocarbon radicals of 8 to 20 carbon atoms each and 3 to 2 lower alkyl radicals. The quaternary ammonium halides and nitrites are known to the art and are commercially available. For example, suitable quaternary ammonium halides are disclosed by Eberz in U.S. Patent 2,550,982 and by Siegel in U.S. Patent 3,008,813. Preferably, the long-chain hydrocarbon radicals are $C_{12}$ to $C_{18}$ alkyl radicals and the other hydrocarbon radicals are loweralkyl, particularly methyl, radicals. The halogen atom of the quaternary ammonium halide is generally bromine or chlorine, preferably chlorine. Suitable quaternary ammonium halides include dioctadecyl dimethyl ammonium chloride, octadecyl trimethyl ammonium chloride, dodecyl trimethyl ammonium chloride, the $C_{12}$–$C_{14}$ alkyl trimethyl ammonium chlorides, the di-$C_{12}$–$C_{14}$ alkyl dimethyl ammonium chlorides, hexadecyl trimethyl ammonium bromide, hexadecyl trimethyl ammonium chloride, dioctadecyl dimethyl ammonium bromide, and dicocodimethyl ammonium chloride wherein "coco" stands for the mixed $C_8$–$C_{18}$ alkyl radicals of cocoamine. Similarly there may be used the nitrites corresponding to the above quaternary ammonium halides. A preferred salt of this type is dicocodimethylammonium nitrite, wherein "coco" has the significance indicated above, and which is a commercial product. In formulating the multipurpose concentrates, it is often beneficial, though not necessary, to employ small proportions of a blending and fluidizing solvent, such as isopropyl alcohol.

In addition to the quaternary ammonium compound there may also be used a metal deactivator such as N,N'-di-(orthohydroxyarylidene)-1,2-alkylenediamines, wherein the arylidene radical contains 6–7 carbon atoms and the alkylene radical contains 2–3 carbon atoms, i.e., 1,2-ethylene and 1,2-propylene. Preferred metal deactivators are N,N'-disalicylidene-1,2-propylenediamine and N,N'-disalicylidene-1,2-ethylenediamine. Such N,N'-di-(orthohydroxyarylidene)-1,2-alkylenediamines will be employed in a proportion of from about 0.1 to about 0.5 part by weight per part of the tripolymer.

In order to more clearly illustrate this invention, preferred modes of carrying the same into effect, and the advantageous results to be obtained thereby, the following examples are given, in which the parts and proportions are by weight except where specifically indicated otherwise.

*Example 1*

N,N-dimethylcyclohexylamine, Polymer A, Kerosene, and other components as identified below were mixed in the proportions given in Table I to provide fuel oil stabilizing additive compositions I–VII of this invention.

Polymer A is a 50% by weight solution in kerosene of a 50/40/10 tripolymer of octadecenyl methacrylate, styrene and beta-diethylaminoethyl methacrylate contained in combined form as the essential monomeric copolymerizable ethylenically unsaturated compounds, said tripolymer containing 0.1% to 3.5% by weight of basic amino nitrogen and having an inherent viscosity of 0.1 to 3.0 as determined at 0.1% weight/volume concentration in benzene at 25° C., which was prepared essentially as described by Catlin and Robbins in U.S. Patent 2,737,452. Thus, the amount of the tripolymer (active ingredient) will be half of the indicated amounts of Polymer A.

The dicocodimethylammonium chloride, where used, was added as a 75% by weight solution in isopropyl alcohol. The dicocodimethylammonium nitrite, where used, was added as a 50% by weight solution in isopropyl alcohol.

DMD in the table below stands for N,N'-disalicylidene-1,2-propylenediamine.

TABLE I.—N,N-DIMETHYLCYCLOHEXYLAMINE/AMINO NITROGEN-CONTAINING POLYMER BLENDS
[Blend composition, percent weight]

| Additives | I | II | III | IV | V | VI | VII |
|---|---|---|---|---|---|---|---|
| Polymer A | 40 | 30 | 60 | 40 | 40 | 46 | 46 |
| DMCHA | 30 | 35 | 20 | 20 | 30 | 18.4 | 18 |
| Dicocodimethylammonium chloride | | | 10 | 10 | 10 | | |
| Dicocodimethylammonium nitrite | | | | | | 12 | 9 |
| DMD | | | | | | 8 | 8 |
| Kerosene [1] | 30 | 35 | 10 | 30 | 20 | 15.6 | 19 |

[1] In addition to that in Polymer A.

Additive VI constitutes a particularly preferred composition of this invention. It may also be described as consisting of, by weight, 23% (1 part) tripolymer (50% of Polymer A), 18.4% (0.8 part) N,N-dimethylcyclohexylamine, 6% (0.26 part) dicocodimethylammonium nitrite, 6% isopropyl alcohol, 8% (0.35 part) N,N'-disalicylidene-1,2-propylenediamine, and 38.6% kerosene (23% from Polymer A).

Fuel oil stabilizing compositions I, II, III, IV and V above are used by stirring into representative commercial No. 2 fuel oils, Fuel A (catalytically cracked) and Fuel B, in the concentrations given in Table IIA, which also summarizes typical test results. The effectiveness of these compositions to inhibit deterioration and insoluble residue formation at elevated temperatures is illustrated by the Enjay Test and the EMD Diesel Fuel Stability Test.

The Enjay Test involves a 16-hour exposure of the sample at 210° F. and is more fully described by Geller and Sturgis in U.S. Patent 2,912,314 (Example 1) and by Ertelt et al. in U.S. Patent 2,974,025 (Example 2).

The EMD Diesel Fuel Test (also known as the "Union Pacific Test" or the "Nalco" test) is a 300° F. accelerated fuel oil stability test designed to determine the relative stability of distillate fuels under short-term, high temperature aging conditions involving air exposure. It is also used to evaluate the effectiveness of additives in inhibiting residue formation and color degradation of distillate fuels. The procedure consists of aging the fuel sample at 300° F. for 90 minutes, cooling to room temperature, and collecting any insoluble residue by vacuum filtration through No. 1 Whatman filter paper (blotter). The appearance of the resultant blotter is noted or it may be compared with a set of standards to obtain a numerical rating of 1 to 20 for the performance of the fuel. The amount and color of the precipitate collected on the blotter determines the rating and indicates the extent of fuel deterioration. The lower the rating the more stable the fuel. In general a rating of 7 or less is desirable.

From Table III, it is apparent that the non-polymeric N,N-dimethylcyclohexylamine is a more effective high temperature stabilizer than the basic amino nitrogen-con- TABLE IIA.—STABILIZATION OF FUEL OIL WITH DIMETHYLCYCLOHEXYLAMINE-AMINOPOLYMER BLENDS

| Additive Blend | Concentration, lbs./1,000 bbls. (percent wt.) of fuel | Enjay Test (210° F.) | | | | EMD Diesel Fuel Test (300° F.) Filter Paper Appearance | |
|---|---|---|---|---|---|---|---|
| | | ASTM Color After Test | | Mg. Residue/600 g. Oil | | Fuel A | Fuel B |
| | | Fuel A | Fuel B | Fuel A | Fuel B | | |
| None | | 5− | 6½− | 12.4 | 46.4 | Black | Black. |
| Polymer A (control) | 5 (0.0017) | 5− | 6½− | 10.9 | 44.5 | do | Dark Brown. |
| | 10 (0.0033) | 5− | 6− | 7.3 | 6.3 | Grey-Black | Do. |
| | 15 (0.005) | 6− | 6− | 2.5 | 4.3 | Grey | Brown, spotted. |
| I | 5 (0.0017) | 5− | 2− | 3.0 | 0.2 | Grey | Grey Brown. |
| | 10 (0.0033) | 4− | 2− | 0.4 | 0.0 | Light Grey | Tan. |
| | 15 (0.005) | 4− | 2− | 0.0 | 0.0 | Tan | Colorless. |
| II | 5 (0.0017) | 4− | 2− | 0.0 | 2.1 | Grey | Grey. |
| | 10 (0.0033) | 4− | 2− | 0.0 | 1.1 | Light Grey | Light Grey. |
| | 15 (0.005) | 4− | 2− | 0.0 | 1.3 | Very Light Grey | Colorless. |
| III | 10 (0.0033) | 4− | 2− | 1.3 | 1.3 | Light Grey | Tan. |
| | 15 (0.005) | 4− | 2− | 0.7 | 0.0 | Almost Colorless | Very Light Tan. |
| IV | 15 (0.005) | 4− | 2− | 0.9 | 0.0 | do | Do. |
| V | 15 (0.005) | 4− | 2− | 0.4 | 0.8 | do | Almost Colorless. |

The effectiveness of multicomponent additive VI as a fuel oil stabilizer was evaluated in the "Proposed Method for Accelerated Stability Test for Distillate Fuel Oil," Appendix XVI, ASTM Standards for Petroleum Products, Vol. 1, 38th Edition 1961. The fuel was a blended straight run and catalytically cracked No. 2 fuel oil. The results are shown in Table IIB.

TABLE IIB.—STABILIZATION OF FUEL OIL WITH ADDITIVE BLEND VI

| Conc., lbs./1,000 bbls. (percent wt.) of fuel | Accelerated Stability Test | |
|---|---|---|
| | ASTM Color | Insoluble Residue, mg./100 ml. |
| 0 | L 5.0 | 6.4 |
| 5 (0.0017) | L 3.5 | 2.3 |
| 15 (0.005) | L 2.5 | 0.2 |
| 25 (0.008) | L 2.5 | 0.1 |

The data show that the co-additive blends containing N,N-dimethylcyclohexylamine are greatly superior to the basic amino nitrogen-containing tripolymer alone in stabilizing fuel against discoloration and formation of sediment, particularly in the EMD Diesel Fuel Test and the Accelerated Stability Test.

*Example 2*

Samples of Fuel B of Example 1, treated to contain N,N-dimethylcyclohexylamine (DMCHA), Polymer A, and mixtures thereof, as given below, are subjected to the EMD Diesel Fuel Test. Table III shows typical results of such treatment.

TABLE III

| Additive and Conc., lbs./1,000 bbls. | | EMD Diesel Fuel Test Filter Paper Appearance |
|---|---|---|
| None | | Black. |
| DMCHA | 1 | Grey Black. |
| | 2 | Grey. |
| | 3 | Light Grey. |
| | 5 | Tan. |
| | 7 | Do. |
| | 10 | Do. |
| | 15 | Light Tan. |
| Polymer A | 5 | Brown, spotted. |
| | 10 | Do. |
| | 15 | Do. |
| Polymer A, 10 lbs. plus DMCHA | 1 | Brown. |
| | 2 | Light Brown. |
| | 3 | Tan. |
| | 4 | Very Light Tan. |
| | 5 | Colorless. | taining copolymer. However, the effectiveness of each is limited, and only the combination of the two additives gives a clean blotter (appearance of filter paper).

*Example 3*

The cyclohexyl tertiary amine (DMCHA) is surprisingly effective by comparison with non-polymeric aliphatic primary amines, represented by a commercial mixture of $C_{12}$–$C_{15}$ tertiary alkyl primary amines sold as "Primene" 81 R, in fuel oils containing the basic amino nitrogen-containing copolymer, as shown in Table IV below wherein the fuel oil is Fuel B of Example 1.

TABLE IV.—COMPARISON OF AMINES AS CO-ADDITIVES WITH POLYMER A IN THE EMD DIESEL FUEL TEST
[Polymer A Conc.=10 lbs./1,000 bbls.]

| Amine Concentration, lbs./1,000 bbls. | "Primene" 81 R | DMCHA [1] |
|---|---|---|
| 0 | Brown, spotted | Brown, spotted. |
| 1 | do | Brown. |
| 2 | do | Light Brown. |
| 3 | do | Tan. |
| 4 | do | Very light Tan. |
| 5 | do | Colorless. |

[1] The DMCHA data are from Table III.

This cyclohexyl tertiary amine is clearly superior to the mixture of $C_{12}$–$C_{15}$ tertiary alkyl primary amines in this use.

*Example 4*

Three polymeric dispersants as identified below were tested in two commercial No. 2 fuel oils (designated below as 3–13 and 2–41, both being blends of straight run and catalytically cracked stocks) with and without N,N-diethyl cyclohexylamine (DECHA) according to the 300° F. EMD Diesel Fuel Test described under Example 1. Results are summarized in the table below in terms of ASTM color and numerical blotter ratings.

The polymeric dispersant employed in tests 5 and 6 is Polymer A in Example 1.

The polymeric dispersant designated Commercial Additive R (tests 9 and 10) is understood to consist essentially of a copolymer of an N-vinyl pyrrolidinone and an acrylic ester as more particularly described by Bauer et al. in Canadian Patent 592,974.

The polymeric dispersant designated as Commercial Additive E (tests 7 and 8) is understood to consist essentially of a copolymer of 1 mole isoctyl chloropropyleneoxy maleate, 4 moles vinyl acetate and 3 moles of mixed $C_{16}$–$C_{18}$ alkyl fumarates which formulation corresponds to a 19/20/61 tripolymer on a weight basis. This polymeric dispersant was employed in these tests as a 45% by weight solution in benzene.

The polymer concentration given in the table are of the active ingredient (polymeric component) in each case.

The results show that the combination of N,N-diethylcyclohexylamine and polymeric dispersant is significantly more effective in stabilizing both fuels against deterioration at elevated temperatures than either additive alone at the same concentration.

SYNERGISTIC STABILIZATION EFFECT OF POLYMERIC DISPERSANT AND N,N-DIETHYLCYCLOHEXYLAMINE (DECHA) IN THE EMD DIESEL FUEL TEST

| Test No. | Polymer Composition | Polymer Conc., lbs./1,000 bbls. | DECHA Conc., lbs./1,000 bbls. | Fuel 3-13 | | Fuel 2-41 | |
|---|---|---|---|---|---|---|---|
| | | | | ASTM Color | Blotter Rating | ASTM Color | Blotter Rating |
| 1 | No additive, control before test | | | L 1.5 | 1 | L 2.5 | 1 |
| 2 | ----do---- | | | L 5.5 | 15 | D 8 | 18 |
| 3 | No polymer, only amine added | | 5 | L 3.0 | 9 | L 3.5 | 5 |
| 4 | ----do---- | | 10 | L 3.0 | 8 | L 3.5 | 4 |
| 5 | 50/40/10 Octadecenylmethacrylate/styrene/diethyl aminoethyl methacrylate. | 10 | | L 3.5 | 5 | L 6.5 | 7 |
| 6 | ----do---- | 5 | 5 | L 3.0 | 4 | L 3.5 | 3 |
| 7 | Commercial Additive E | 10 | | L 5.5 | 12 | D 8 | 12 |
| 8 | ----do---- | 5 | 5 | L 3.0 | 4 | L 3.5 | 4 |
| 9 | Commercial Additive R | 10 | | L 6.0 | 10 | D 8 | 16 |
| 10 | ----do---- | 5 | 5 | L 3.0 | 4 | L 3.5 | 4 |

*Example 5*

The persistance of water haze in No. 2 distillate fuel oils was evaluated as follows: A 150 ml. fuel sample, with or without additive, was placed in a one pint wide-mouthed jar, a 0.3 ml. portion of distilled water was added, and the mixture was then stirred for 5 minutes at high speed with a Hamilton-Beach No. 51 "Drinkmaster" mixer modified by the addition of a small platform to hold pint jars. A portion of the stirred sample was immediately transferred to a 20 mm. absorption cell and haziness was evaluated by measuring the percent transmission of light at 640 m$\mu$ wavelength through the sample by means of a "Lumetron" Photoelectric colorimeter, Model 402E, equipped wth a General Electric T-8, 100 watt projection bulb and a monochromatic, narrow band filter, No. M-640 having a 640 m$\mu$ wavelength transmission peak.

The pint jar was next capped and allowed to stand motionless for subsequent percent transmission evaluations at 2 hours and 6 hours standing. If percent transmission of a sample became greater than 90%, the test was terminated for the sample.

The antihazing effectiveness of Additive VII is illustrated in Table V.

TABLE V.—EFFECT OF ADDITIVE VII ON HAZE IN NO. 2 DISTILLATE FUEL OILS

| Add. VII Conc., lb./M bbl. (percent wt.) | Percent Light Transmission | | | | | |
|---|---|---|---|---|---|---|
| | Oil D [1] | | Oil E [2] | | Oil F [3] | |
| | 2 hrs. | 6 hrs. | 2 hrs. | 6 hrs. | 2 hrs. | 6 hrs. |
| 0 (0) | 36 | 66 | 11 | 32 | 21 | 85 |
| 10 (0.003) | 87 | 98 | 44 | 83 | 37 | 91 |
| 20 (0.006) | 98 | | 87 | 98 | 94 | |

[1] Oil D—A No. 2 heating oil blend of catalytically cracked and straight run stocks.
[2] Oil E—A hydrogenated No. 2 heating oil.
[3] Oil F—A hydrogenated No. 2 heating oil.

The results show that additive VII is highly effective to combat haze in heating oils.

*Example 6*

The tendency to emulsify of a No. 2 distillate heating oil, with and without additive VII, was evaluated as follows: To 2500 ml. samples of Oil D of Example 5 were added 33.2 p.p.m. and 66.4 p.p.m. of additive VII; a third, undoped sample was held as a control. To three 600 ml. tall-form beakers were adedd 190 ml. of oil and 10 ml. of distilled water. The mixtures were stirred at high speed for 5 minutes with the "Drinkmaster" mixer described in Example 5, then the beakers were capped with watch glasses and allowed to stand at room temperature for 24 hours. The oil was then carefully siphoned off each sample and the water left in the beaker. A new 190 ml. portion of oil from the previously prepared 2500 ml. master samples was next added to each of the three beakers and the stirring and 24 hour standing repeated. Emulsification was evaluated by observing the number of oil changings or stirrings required to produce sufficient emulsification in the water phase so that the water phase was not mobile when the beaker was tilted at the end of the 24 hour standing period. Ten stirrings, i.e. 9 changes of oil after the first or original stirring were the maximum number used. Table VI summarizes the results.

TABLE VI

| Additive VII Concentration, pounds per 1,000 bbls. (percent wt.) | Number of oil changes necessary to produce non-mobile emulsion in water phase; one less than the number of stirrings. |
|---|---|
| 0 (0) | 5 |
| 10 (0.003) | >9 |
| 20 (0.006) | 9 |

*Example 7*

This example demonstrates antirust properties for additive VI, evaluated in Oil D by the ASTM D-665-60 Dynamic Rust Test involving a 20 hour test period, doubly distilled water and visual grading of the test billet.

TABLE VII

| Additive VI Concentration, lbs./M bbls. (percent wt.) | Visual Percent Rust |
|---|---|
| 0 (0) | 100 |
| 5 (0.0017) | 40 |
| 15 (0.005) | 27 |
| 25 (0.008) | 10 |

*Example 8*

A variety of polymeric dispersants, as identified below, were tested in a commercial No. 2 fuel oil (designated below as 3-13, a blend of straight run and catalytically cracked stocks) with and without N,N-dimethylcyclohexylamine (DMCHA) according to the 300° F. EMD Diesel Fuel Test described under Example 1. Results are summarized in Table VIII in terms of ASTM color and numerical blotter ratings.

The polymeric dispersants employed are described below in terms of percent by wt. of the monomers used in their preparation. For these tests, they were generally handled and added as 40%-60% solutions in benzene or kerosene; polymer concentrations in Table VIII are of the active ingredient (polymeric component).

The polymeric dispersant designated Commercial Additive R (tests 2 and 3) is understood to consist essentially of a copolymer of an N-vinyl pyrrolidinone and an acrylic ester as more particularly described by Bauer et al. in Canadian Patent 592,974. It will be noted that the 90/10 lauryl methacrylate/N-vinyl pyrrolidinone copolymer of tests 10 and 11 gave substantially similar performance with and without DMCHA.

The polymeric dispersant designated as Commercial Additive E (tests 4 and 5) is understood to consist essentially of a copolymer of 1 mole isooctyl chloropropyleneoxy maleate, 4 moles vinyl acetate and 3 moles of mixed $C_{16}$-$C_{18}$ alkyl fumarates which formulation corresponds to a 19/20/61 tripolymer on a weight basis. This polymeric dispersant was employed in these tests as a 45% by weight solution in benzene.

It should be further noted that the lauryl group of the Table VIII polymer formulations stands for technical lauryl, derived from "Lorol" 5, a mixture of straight chain primary alkanols of the following approximate distribution: decyl alcohol 2.6%, lauryl alcohol 61.0%, myristyl alcohol 23.0%, cetyl alcohol 11.2%, and stearyl alcohol 2.2% by wt.

set forth in the general disclosure, many variations and modifications can be made in the materials, proportions and conditions employed, without departing from the spirit or scope of this invention.

From the preceding description, it will be apparent that this invention provides distillate hydrocarbon fuel oils which are stabilized against objectionable deterioration by novel combinations of additives which, in combination are unusually effective for such purpose. It will also be apparent that this invention provides novel additive compositions for distillate hydrocarbon fuel oils which compositions are homogeneous concentrates of combinations of co-additives which in combination are unusually effective for stabilizing distillate hydrocarbon fuel oils. Accordingly, it will be apparent that this invention constitutes a valuable contribution to and advance in the art.

The embodiments of the invention in which an exclusive property or privilege is claimed are defined as follows:

1. An additive composition for distillate hydrocarbon fuel oils, which additive composition consists essentially of
  (a) an oil-soluble polymeric dispersant taken from the group consisting of
    ($a_1$) a copolymer comprising in copolymerized form from 10% to 30% by weight of a $C_8$-$C_{18}$ alkyl chloropropyleneoxy mixed ester of a $C_4$-$C_5$ unsaturated conjugated dibasic acid and from 90% to 70% by weight of a copolymerizable monomer taken from the group consisting of vinyl esters of $C_1$-$C_4$ fatty carboxylic acids, $C_8$-$C_{20}$ alkyl maleates, $C_8$-$C_{20}$ alkyl fumarates, and mixtures thereof, said copolymer having a molecular weight between 6,000 and 20,000 Staudinger, and TABLE VIII.—SYNERGISTIC STABILIZATION EFFECT OF POLYMERIC DISPERSANT AND DMCHA IN 300° F. ACCELERATED FUEL OIL STABILITY TEST

| Test | Polymer Composition | Polymer Conc., lbs./1,000 bbls. | DMCHA Conc., lbs./1,000 bbls. | Test Results | |
|---|---|---|---|---|---|
| | | | | ASTM Color Fuel 3-13 | Blotter Rating Fuel 3-13 |
| 1 | | | 10 | L 3.0 | 7 |
| 2 | Commercial Additive R | 10 | | L 6.0 | 9 |
| 3 | Commercial Additive R | 5 | 5 | L 3.0 | 4 |
| 4 | Commercial Additive E | 10 | | L 6.0 | 10 |
| 5 | Commercial Additive E | 5 | 5 | L 3.0 | 4 |
| 6 | 80/20 Lauryl methacrylate/diethylaminoethyl methacrylate | 10 | | L 4.5 | 8 |
| 7 | | 5 | 5 | L 3.0 | 4 |
| 8 | 50/37/13 Octadecenyl methacrylate/styrene/dibutylaminoethyl methacrylate | 10 | | L 5.5 | 9 |
| 9 | | 5 | 5 | L 3.0 | 4 |
| 10 | 50/40/10 Lauryl methacrylate/styrene/tert-butylaminoethyl methacrylate | 10 | | L 5.0 | 11 |
| 11 | | 5 | 5 | L 3.0 | 5 |
| 12 | 90/10 Lauryl methacrylate/N-vinyl pyrrolidinone | 10 | | L 6.0 | 10 |
| 13 | | 5 | 5 | L 3.0 | 4 |
| 14 | 50/40/10 Lauryl methacrylate/styrene/morpholinoethyl methacrylate | 10 | | L 5.5 | 11 |
| 15 | | 5 | 5 | L 3.0 | 4 |
| 16 | 50/40/10 Lauryl methacrylate/styrene/dimethylaminoethyl methacrylate | 10 | | L 5.0 | 10 |
| 17 | | 5 | 5 | L 3.0 | 4 |
| 18 | No additive, control after test | | | L 6.0 | 15 |
| 19 | No additive, control before test | | | L 1.5 | |

The results show (1) that the polymeric dispersant/substituted cyclohexylamine combination is more effective than either additive alone in stabilizing the fuel against deterioration at elevated temperatures and (2) the synergistic effect is generic to a wide variety of polymeric dispersants including specific commercially available formulations R and E (Table VIII).

It will be understood that the preceding examples have been given for illustrative purposes solely and that this invention is not limited to the specific embodiments described therein. On the other hand, it will be apparent to those skilled in the art that, subject to the limitations ($a_2$) a copolymer comprising in copolymerized form from 5% to 30% by weight of an N-vinyl pyrrolidinone taken from the group consisting of N-vinyl pyrrolidinone and ring-alkylated N-vinyl pyrrolidinones having from 7 to 10 carbon atoms in the molecule, 65% to 95% by weight of at least one acrylic ester of the formula $CH_2=C(R)COOR_1$ wherein R is a member of the group consisting of hydrogen and methyl radicals and $R_1$ stands for at least one alkyl group of from 4 to 18 carbons and having an average of at least 8 carbon atoms, and 0% to 5% by weight of an aminoalkyl acrylate of the formula $CH_2=C(R)COOC_nH_{2n}NR_2R_3$ wherein R is a member of the group consisting of hydrogen and methyl radicals, $C_nH_{2n}$ stands for an alkylene radical wherein $n$ is an integer of from 2 to 3, and $R_2$ and $R_3$ are members of a group of $C_1-C_4$ alkyl radicals when taken individually and members of a group of ethylene, trimethylene, tetramethylene and diethyleneoxy radicals when taken together, and (b) from 0.2 to about 3 parts by weight per part of said polymeric dispersant (a) of an N-substituted cyclohexylamine in which the substituents consist of 2 alkyl groups of 1 to 2 carbon atoms, and (c) a normally liquid inert hydrocarbon carrier solvent in an amount to constitute from about 20% to about 80% by weight of the composition.

2. An additive composition for distillate hydrocarbon fuel oils, which additive composition consists essentially of (a) an oil-soluble polymeric dispersant taken from the group consisting of ($a_1$) a copolymer comprising in copolymerized form from 10% to 30% by weight of a $C_8-C_{18}$ alkyl chloropropyleneoxy mixed ester of a $C_4-C_5$ unsaturated conjugated dibasic acid and from 90% to 70% by weight of a copolymerizable monomer taken from the group consisting of vinyl esters of $C_1-C_4$ fatty carboxylic acids, $C_8-C_{20}$ alkyl maleates, $C_8-C_{20}$ alkyl fumarates, and mixtures thereof, said copolymer having a molecular weight between 6,000 and 20,000 Staudinger, and ($a_2$) a copolymer comprising in copolymerized form from 5% to 30% by weight of an N-vinyl pyrrolidinone taken from the group consisting of N-vinyl pyrrolidinone and ring-alkylated N-vinyl pyrrolidinones having from 7 to 10 carbon atoms in the molecule, 65% to 95% by weight of at least one acrylic ester of the formula $CH_2=C(R)COOR_1$ wherein R is a member of the group consisting of hydrogen and methyl radicals and $R_1$ stands for at least one alkyl group of from 4 to 18 carbons and having and average of at least 8 carbon atoms, and 0% to 5% by weight of an aminoalkyl acrylate of the formula $CH_2=C(R)COOC_nH_{2n}NR_2R_3$ wherein R is a member of the group consisting of hydrogen and methyl radicals, $C_nH_{2n}$ stands for an alkylene radical wherein $n$ is an integer of from 2 to 3, and $R_2$ and $R_3$ are members of a group of $C_1-C_4$ alkyl radicals when taken individually and members of a group of ethylene, trimethylene, tetramethylene and diethyleneoxy radicals when taken together, and (b) from about 0.5 to about 2 parts by weight per part of said polymeric dispersant (a) of N,N-dimethylcyclohexylamine, and (c) a normally liquid inert hydrocarbon carrier solvent in an amount to constitute from about 40% to about 60% by weight of the composition.

3. An additive composition for distillate hydrocarbon fuel oils, which additive composition consists essentially of (a) an oil-soluble addition copolymer which is a 19/20/61 tripolymer of isooctyl chloropropyleneoxy maleate, vinyl acetate, and mixed $C_{16}-C_{18}$ alkyl fumarates, (b) from about 0.5 to 2 parts by weight per part of said tripolymer of N,N-dimethylcyclohexylamine, and (c) a normally liquid inert hydrocarbon carrier solvent in an amount to contribute from about 40% to about 60% by weight of the composition.

4. An additive composition for distillate hydrocarbon fuel oils, which additive composition consists essentially of (a) an oil-soluble addition copolymer of about 90 parts by weight of lauryl methacrylate and about 10 parts by weight of N-vinyl pyrrolidinone, (b) from about 0.5 to 2 parts by weight per part of said copolymer of N,N-dimethylcyclohexylamine, and (c) a normally liquid inert hydrocarbon carrier solvent in an amount to constitute from about 40% to about 60% by weight of the composition.

5. A distillate hydrocarbon fuel oil containing (a) from 0.00017% to about 0.01% by weight of an oil-soluble polymeric dispersant taken from the group consisting of ($a_1$) a copolymer comprising in copolymerized form from 10% to 30% by weight of a $C_8-C_{18}$ alkyl chloropropyleneoxy mixed ester of a $C_4-C_5$ unsaturated conjugated dibasic acid and from 90% to 70% by weight of a copolymerizable monomer taken from the group consisting of vinyl esters of $C_1-C_4$ fatty carboxylic acids, $C_8-C_{20}$ alkyl maleates, $C_8-C_{20}$ alkyl fumarates, and mixtures thereof, said copolymer having a molecular weight between 6,000 and 20,000 Staudinger, and ($a_2$) a copolymer comprising in copolymerized form from 5% to 30% by weight of an N-vinyl pyrrolidinone taken from the group consisting of N-vinyl pyrrolidinone and ring-alkylated N-vinyl pyrrolidinones having from 7 to 10 carbon atoms in the molecule, 65% to 95% by weight of at least one acrylic ester of the formula $CH_2=C(R)COOR_1$ wherein R is a member of the group consisting of hydrogen and methyl radicals and $R_1$ stands for at least one alkyl group of from 4 to 18 carbons and having an average of at least 8 carbon atoms, and 0% to 5% by weight of an aminoalkyl acrylate of the formula $CH_2=C(R)COOC_nH_{2n}NR_2R_3$ wherein R is a member of the group consisting of hydrogen and methyl radicals, $C_nH_{2n}$ stands for an alkylene radical wherein $n$ is an integer of from 2 to 3, and $R_2$ and $R_3$ are members of a group of $C_1-C_4$ alkyl radicals when taken individually and members of a group of ethylene, trimethylene, tetramethylene and diethyleneoxy radicals when taken together, and (b) from 0.00017% to about 0.01% by weight of an N-substituted cyclohexylamine in which the substituents consist of 2 alkyl groups of 1 to 2 carbon atoms.

6. A distillate hydrocarbon fuel oil containing (a) from 0.00017% to about 0.01% by weight of an oil-soluble polymeric dispersant taken from the group consisting of ($a_1$) a copolymer comprising in copolymerized form from 10% to 30% by weight of a $C_8-C_{18}$ alkyl chloropropyleneoxy mixed ester of a $C_4-C_5$ unsaturated conjugated dibasic acid and from 90% to 70% by weight of a copolymerizable monomer taken from the group consisting of vinyl esters of $C_1-C_4$ fatty carboxylic acids, $C_8-C_{20}$ alkyl maleates, $C_8-C_{20}$ alkyl fumarates, and mixtures thereof, said copolymer having a molecular weight between 6,000 and 20,000 Staudinger, and ($a_2$) a copolymer comprising in copolymerized form from 5% to 30% by weight of an N-vinyl pyrrolidinone taken from the group consisting of N-vinyl pyrrolidinone and ring-alkylated N-vinyl pyrrolidinones having from 7 to 10 carbon atoms in the molecule, 65% to 95% by weight of at least one acrylic ester of the formula $CH_2=C(R)COOR_1$ wherein R is a member of the group consisting of hydrogen and methyl radicals and $R_1$ stands for at least one alkyl group of from 4 to 18 carbons and having an average of at least 8 carbon atoms, and 0% to 5% by weight of an aminoalkyl acrylate of the formula $CH_2=C(R)COOC_nH_{2n}NR_2R_3$ wherein R is a member of the group consisting of hydrogen and methyl radicals, $C_nH_{2n}$ stands for an alkylene radical wherein n is an integer of from 2 to 3, and $R_2$ and $R_3$ are members of a group of $C_1$–$C_4$ alkyl radicals when taken individually and members of a group of ethylene, trimethylene, tetramethylene and diethyleneoxy radicals when taken together, and (b) from about 0.0003% to about 0.002% by weight of N,N-dimethylcyclohexylamine.

7. A distillate hydrocarbon fuel oil containing
(a) from 0.00017% to about 0.01% by weight of an oil-soluble polymeric dispersant taken from the group consisting of ($a_1$) a copolymer comprising in copolymerized form from 10% to 30% by weight of a $C_8$–$C_{18}$ alkyl chloropropyleneoxy mixed ester of a $C_4$–$C_5$ unsaturated conjugated dibasic acid and from 90% to 70% by weight of a copolymerizable monomer taken from the group consisting of vinyl esters of $C_1$–$C_4$ fatty carboxylic acids, $C_8$–$C_{20}$ alkyl maleates, $C_8$–$C_{20}$ alkyl fumarates, and mixtures thereof, said copolymer having a molecular weight between 6,000 and 20,000 Staudinger, and ($a_2$) a copolymer comprising in copolymerized form from 5% to 30% by weight of an N-vinyl pyrrolidinone taken from the group consisting of N-vinyl pyrrolidinone and ring-alkylated N-vinyl pyrrolidinones having from 7 to 10 carbon atoms in the molecule, 65% to 95% by weight of at least one acrylic ester of the formula $CH_2=C(R)COOR_1$ wherein R is a member of the group consisting of hydrogen and methyl radicals and $R_1$ stands for at least one alkyl group of from 4 to 18 carbons and having an average of at least 8 carbon atoms, and 0% to 5% by weight of an aminoalkyl acrylate of the formula $CH_2=C(R)COOC_nH_{2n}NR_2R_3$ wherein R is a member of the group consisting of hydrogen and methyl radicals, $C_nH_{2n}$ stands for an alkylene radical wherein n is an integer of from 2 to 3, and $R_2$ and $R_3$ are members of a group of $C_1$–$C_4$ alkyl radicals when taken individually and members of a group of ethylene, trimethylene, tetramethylene and diethyleneoxy radicals were taken together, (b) from 0.0003% to about 0.002% by weight of N,N-dimethylcyclohexylamine, and (c) from about 0.0001% to about 0.001% by weight of an oil-soluble quaternary ammonium salt of the group consisting of quaternary ammonium halides and nitrites in which the groups attached to nitrogen, other than the halogen and nitrite groups, consist of 1 to 2 hydrocarbon radicals of 8 to 20 carbon atoms and 3 to 2 loweralkyl radicals.

8. A distillate hydrocarbon fuel oil containing
(a) from about 0.0005% to about 0.005% by weight of an oil-soluble, addition copolymer containing in combined form as its essential monomeric components about 19 parts by weight of isooctyl chloropropyleneoxy maleate, about 20 parts by weight vinyl acetate and about 61 parts by weight mixed $C_{16}$–$C_{18}$ alkyl fumarates, and (b) from about 0.0003% to about 0.002% by weight of N,N-dimethylcyclohexylamine.

9. A distillate hydrocarbon fuel oil containing
(a) from about 0.0005% to about 0.005% by weight of an oil-soluble, nitrogen-containing addition copolymer containing in combined form as its essential monomeric components about 90 parts by weight lauryl methacrylate and about 10 parts by weight N-vinyl pyrrolidinone, and (b) from about 0.0003% to about 0.002% by weight of N,N-dimethylcyclohexylamine.

10. An additive composition for distillate hydrocarbon fuel oils which comprises
(a) as polymeric dispersant, an oil-soluble, basic amino nitrogen-containing addition copolymer containing in combined form as its essential monomeric components copolymerizable ethylenically unsaturated compounds, each containing only one polymerizable ethylenic linkage, said copolymer comprising from about 50% to 92.5% by weight of a component consisting of carbon, hydrogen and oxygen and, as it exists in the polymer, containing a side chain selected from the group consisting of —$CO_2R$ and —OR in which R is an aliphatic hydrocarbon chain of 8 to about 18 carbon atoms, and from about 7.5% to 23% by weight of a component, as it exists in the polymer, containing a basic amino nitrogen in the side chain, said copolymer containing 0.1% to 3.5% by weight of basic amino nitrogen and said copolymer having an inherent viscosity of 0.1 to 3.0 as determined at 0.1% weight/volume concentration in benzene at 25° C., (b) from 0.2 to about 3 parts by weight per part of said polymeric dispersant of N,N-diethylcyclohexylamine, and (c) a normally liquid inert hydrocarbon carrier solvent in an amount to constitute from about 20% to about 80% by weight of the composition.

11. The additive composition of claim 10 in which the N,N-diethylcyclohexylamine is present in an amount from about 0.5 to about 2 parts by weight per part of said polymeric dispersant, and the normally liquid inert hydrocarbon carrier solvent is present in an amount to constitute from about 40% to about 60% by weight of composition.

12. A distillate hydrocarbon fuel oil containing
(a) as polymeric dispersant, from 0.00017% to about 0.01% by weight of an oil-soluble, basic amino nitrogen-containing addition copolymer containing in combined form as its essential monomeric components copolymerizable ethylenically unsaturated compounds, each containing only one polymerizable ethylenic linkage, said copolymer comprising from about 50% to 92.5% by weight of a component consisting of carbon, hydrogen and oxygen and, as it exists in the polymer, containing a side chain selected from the group consisting of —$CO_2R$ and —OR in which R is an aliphatic hydrocarbon chain of 8 to about 18 carbon atoms, and from about 7.5% to 23% by weight of a component, as it exists in the polymer, containing a basic amino nitrogen in the side chain, said copolymer containing 0.1% to 3.5% by weight of basic amino nitrogen and said copolymer having an inherent viscosity of 0.1 to 3.0 as determined at 0.1% weight/volume concentration in benzene at 25° C., and (b) from 0.00017% to about 0.01% by weight of N,N-diethylcyclohexylamine.

13. The distillate hydrocarbon fuel oil of claim 12 containing from about 0.0003% to about 0.002% N,N-diethylcyclohexylamine.

14. The distillate hydrocarbon fuel oil of claim 13 containing from about 0.0005% to about 0.005% polymeric dispersant.

(References on following page)

References Cited

UNITED STATES PATENTS

| | | | |
|---|---|---|---|
| 2,284,267 | 5/1942 | Downing et al. | 44—73 |
| 2,684,292 | 7/1954 | Caron et al. | 44—74 |
| 3,008,813 | 11/1961 | Siegel | 44—62 |
| 3,142,664 | 7/1964 | Bauer | 44—62 X |
| 3,186,810 | 6/1965 | Dunworth | 44—62 |

DANIEL E. WYMAN, *Primary Examiner.*

W. J. SHINE, *Assistant Examiner.*